(No Model.) 2 Sheets—Sheet 1.

A. B. MILLER.
PLATFORM RAKING ATTACHMENT FOR MOWERS.

No. 525,110. Patented Aug. 28, 1894.

Witnesses
John C. Shaw
W. B. Avens

Inventor
Andrew B. Miller,
By his Attorneys.
C. A. Snow & Co.

THE NORRIS PETERS CO., PHOTO-LITHO., WASHINGTON, D. C.

(No Model.) 2 Sheets—Sheet 2.
A. B. MILLER.
PLATFORM RAKING ATTACHMENT FOR MOWERS.
No. 525,110. Patented Aug. 28, 1894.
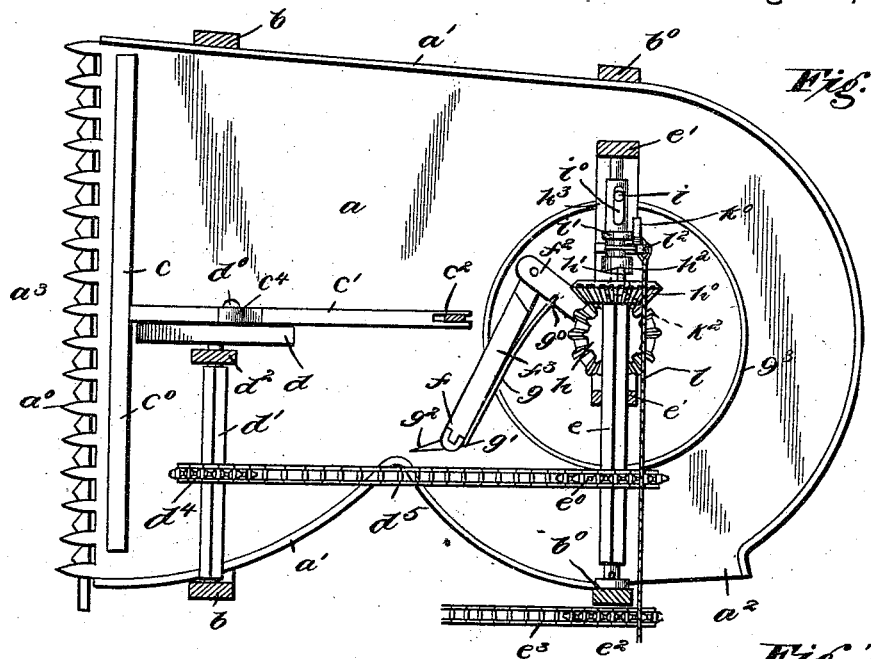
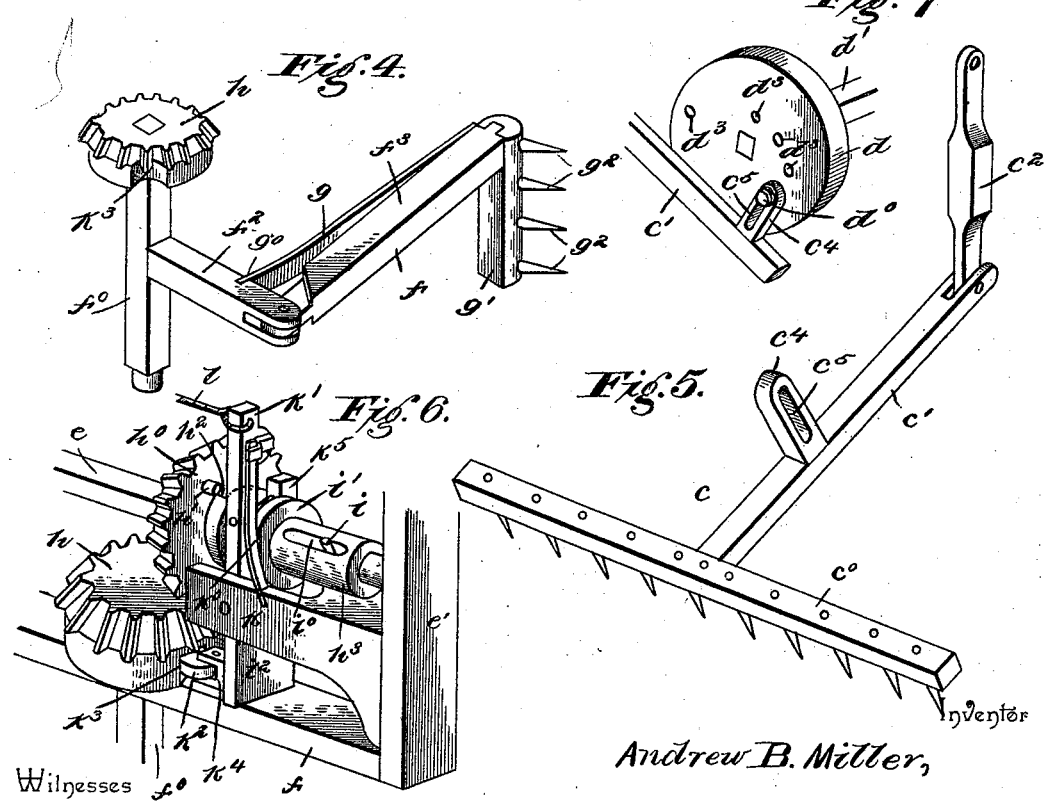
Witnesses
John C. Shaw
F. B. Owens
Inventor
Andrew B. Miller,
By his Attorneys.
C. A. Snow & Co.

UNITED STATES PATENT OFFICE.

ANDREW B. MILLER, OF HERBST, INDIANA.

PLATFORM RAKING ATTACHMENT FOR MOWERS.

SPECIFICATION forming part of Letters Patent No. 525,110, dated August 28, 1894.

Application filed March 9, 1894. Serial No. 503,040. (No model.)

*To all whom it may concern:*

Be it known that I, ANDREW B. MILLER, a citizen of the United States, residing at Herbst, in the county of Grant and State of Indiana, have invented a new and useful Platform Raking Attachment for Mowers, of which the following is a specification.

My invention relates to an improvement in those mowers which are provided with platform raking attachments, whereby the grass may be raked from the knives and deposited in a windrow on the side of the machine; and my primary object is to construct an appliance whereby the grass may be first raked upon a platform and allowed to accumulate there until the operator desires to dispose of it, when he may operate the machine to deposit it as he desires. In the means for attaining this object, lies my invention and the means will be fully described hereinafter and finally embodied in the claims.

Figure 1:
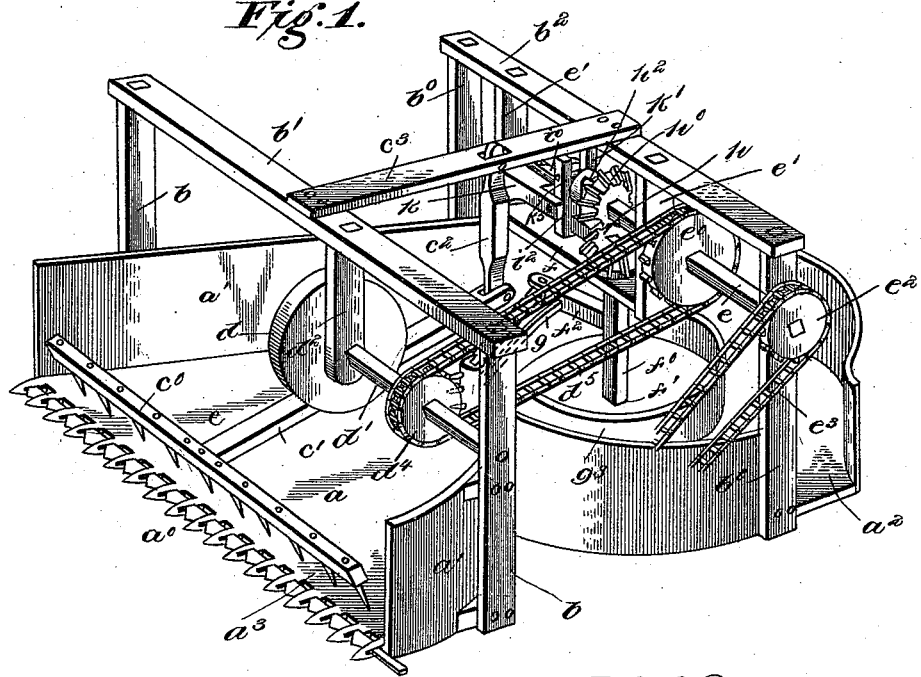
Figure 2:
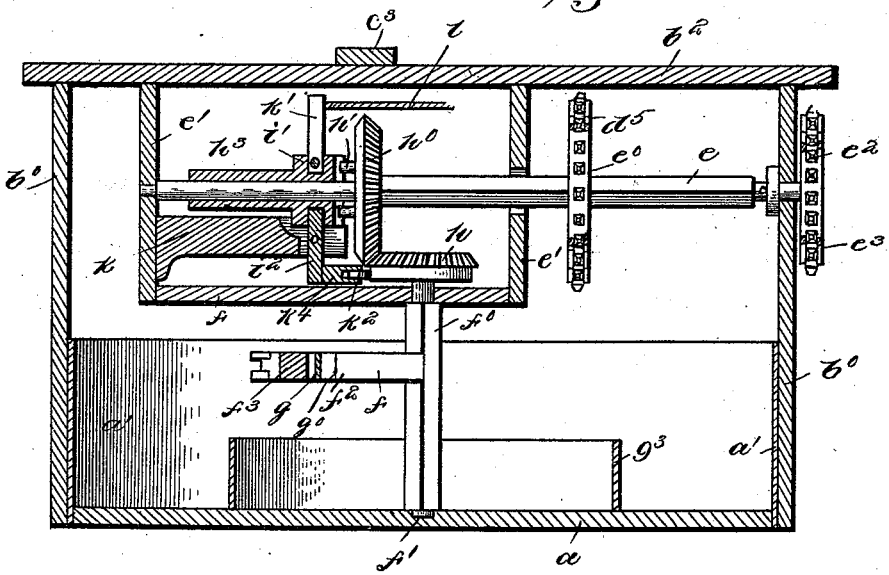

In the accompanying drawings, Figure 1 represents a perspective view thereof; Fig. 2 a cross section; Fig. 3 a horizontal section looking downwardly; Fig. 4 a perspective view of the rear or discharging rake detached; Fig. 5 a similar view of the front rake; Fig. 6 an enlarged perspective view of the clutch mechanism for operating the discharging rake, said mechanism being there shown as detached and standing alone; Fig. 7 a detail of the disk for operating the front rake.

The reference letter $a$ indicates the platform of the mower, to which my improvements are shown as applied, and this is provided with the cutting apparatus $a^0$ and the wall or railing $a'$. The cutting apparatus may be of any preferred class, while railing $a'$ is constructed with the outlet opening $a^2$ arranged to deposit the grass out of the line of subsequent travel and with the usual and necessary opening $a^3$ to admit the grass to be placed upon the platform. Arising vertically from the railing $a'$ are the standards $b$ and $b^0$, which are four in number and arranged in pairs opposite each other and joined at their tops by the beams $b'$ and $b^2$ respectively. Secured to and operating upon these standards and their respective beams is the operative mechanism of my invention.

To accomplish the purpose of my invention I provide two independent operating rakes $c$ and $f$. Rake $c$ is of the vibratory class and consists of a transversely extending head $c^0$ located and operating in the opening $a^3$ of the wall or railing $a'$, and of a shank $c'$ which is rigidly secured to the middle of the head and extends rearwardly to the link $c^2$. The link $c^2$ extends approximately vertically and is pivoted to the longitudinal beam $c^3$, which extends from one of the beams $b'$ or $b^2$ to the other and is rigidly secured to each. Formed integral with or rigidly secured to the shank $c'$ and at a point just forward of its middle is the stud or arm $c^4$, which is formed with the vertically elongated slot $c^5$, adapted to receive the pin $d^0$ of the crank disk $d$. The pin $d^0$ has a free movement in the slot $c^5$ of the arm $c^4$ and the purpose of this peculiar construction will be apparent later on. The crank disk $d$ is fixed to the revoluble shaft $d'$, which is in turn journaled in one of the standards $b$, and in the hanger $d^2$ depending from the cross beam $b'$. Formed in the outer face of the disk $d$ and at various distances from its axis are the openings $d^3$, in which the pin $d^0$ is adapted to fit. The pin $d^0$ is removable and by changing it from one opening to another the rake may be made to vibrate in paths of different distances. As the shaft $d'$ revolves the disk $d$ will, in consequence thereof, follow and impart to the rake $c$ a vertically-elongated elliptical movement; one which will cause the head $c^0$ to engage the platform $a$ at its frontal extremity and move rearwardly for a distance, in practice, about one foot. During this rearward movement the head of the rake does not move in the ellipse which is ordinarily characteristic of it, but travels along the surface of the platform and does not leave it until it has moved the full distance required. This peculiar movement is due to the slot $c^5$ of the arm $c^4$, for when the head $c^0$ is not in engagement with the platform, the weight of the rake will make pin $d^0$ to lie in the upper extremity of the slot, and so it will remain until the head $c^0$ engages the platform, whereupon the pin $d^0$ will be relieved of the weight, and as the disk $d$ proceeds its pin moves downwardly, rearwardly and upwardly and in the arc of a circle, which movement will cause the pin to move down the slot and thence back to its upper extremity and to simultaneously draw the rake rearwardly. Fixed to the shaft $d'$ and revolving therewith is the chain pulley $d^4$, over which the traction chain $d^5$ operates, and from this point the chain extends rearwardly to the shaft $e$, where it passes over a chain pulley $e^0$, and by which the shaft $d'$ and consequently the rake $c$ is driven. The shaft $e$ is revolubly journaled in the left hand standard $b^0$ and in the hangers $e'$ which depend from the cross beam $b^2$. Fixed to the left hand end of the shaft $e$, beyond its bearings, is the drive pulley $e^2$, over which the chain $e^3$ operates, and by which the shaft is revolved. The chain $e^3$ may proceed to any of the operative parts of the mower from which power is derived. Secured to the lower ends of the hangers $e'$ and extending horizontally from one to another is the beam $f$, in which is journaled the upper end of the vertical rotary shaft $f^0$. This shaft is provided for supporting and operating the rear rake $f$, and is journaled at its lower end in the platform, at $f'$. The rear rake consists of two shank sections $f^2$ and $f^3$, the former $f^2$ being fixed to the shaft $f^0$ and extending horizontally therefrom, while the latter, $f^3$, is pivotally connected to the end of section $f^2$ and is given a normal tendency to the right by means of the leaf spring $g$, which is secured to the section $f^2$ at $g^0$, and extends approximately parallel with the section $f^3$ until its end is reached. Here it engages the section $f^3$ and thus the said section is given its normal tendency.

$g'$ designates the head of the rear rake and this extends vertically and is provided with the outwardly extending teeth $g^2$, which are arranged in vertical alignment and which bear against the wall or rail $a'$ at the rear of the platform. The railing $a'$ at the rear of the platform is curved in the arc of a circle and serves as a guide for the shank section $f^3$, while the circular guard $g^3$ is provided and arranged around shaft $f^0$ to form a definite passage for the grass and prevent it from becoming entangled in the shaft. Thus it will be seen that a passage is formed in which the rear rake and the grass actuated thereby is forced to travel. This, however, will be more fully described hereinafter. The upper end of the shaft $f^0$ projects above the beam $f$ and is provided with the bevel gear $h$, which is rigidly fixed to the shaft and which meshes with the corresponding gear $h^0$ on the shaft $e$. This latter gear, $h^0$, is loosely mounted on its shaft and provided on its right hand side with the studs, $h'$, which are arranged opposite each other and adapted to engage with the shouldered notches $h^2$ of the clutch sleeve $h^3$. The clutch sleeve $h^3$ is arranged to embrace the shaft $e$, and is held incapable of independent rotary movement by means of the studs, $i$, which fit in longitudinally elongated slots $i^0$ in the sleeve. This also allows the sleeve a limited independent longitudinal movement, whereby it may engage or disengage the gear $h^0$. Formed on the sleeve, $h^3$, are the parallel annular flanges $i'$, which form a way or groove in which the arms $k'$ and $k^5$ of the clutch lever $i^2$ are arranged, so as to allow the sleeve free rotary movement in the lever and so as to allow it to be moved longitudinally on the shaft $e$. By this means the clutch may be made to operate at will, and by causing it to operate the gear $h^0$ is made to revolve with the shaft and consequently the rear rake operated. The lever $i^2$ is fulcrumed in the bifurcated arm $k$, which is secured to one of the hangers $e'$ and projects inwardly toward the companion hanger. Fixed to the arm $k$ and arising vertically therefrom is the spring $k^0$, which is connected to the arm $k'$ of the lever $i^2$ by a pivotal connection, whereby the lever is given a normal tendency to swing to the right, thus disengaging the clutch and throwing the short and lower arm of lever $i^2$ to the left. This lower arm of lever $i^2$ is provided with a horizontal arm $k^4$, in which an anti-friction roller $k^2$ is journaled and this is adapted to bear against the periphery of the gear, $h$, and is held in contact therewith by means of spring $k^0$ as just explained. The periphery of the gear, $h$, is formed with a semi-circular recess $k^3$, in which the roller $k^2$ is adapted to fall when presented thereto by the revolutions of the gear. This operation will result in a movement of the roller $k^2$ to the left and a consequent disengagement of the clutch. The normal position of the parts is with the roller $k^2$ in the recess $k^3$, and when so arranged the clutch will be disengaged and shaft $c$ free to operate without moving the gear $h^0$ and the parts in connection therewith.

$l$ indicates a cord which is connected to the lever $i^2$, and which extends to the driver or operator of the machine. Here it is connected with suitable actuating mechanism, whereby the cord may be drawn and the lever $i^2$ thrown so that the clutch will be engaged and the roller $k^2$ moved out of its recess $k^3$. This movement will be against the tendency of spring $k^0$, and will continue only long enough to allow the roller $k^2$ to engage the regular periphery of the gear, $h$, when the pressure on the cord, $l$, may be released, since the gear will operate to keep the lever in the position in which it was placed by the operation of the cord $l$, thus causing the latter to be unnecessary. As soon as the clutch attending the gear $h^0$ will be made to positively engage such gear, the rear rake is made to operate, and this operation will continue during one revolution of the gear $h$, whereupon the roller $k^2$ will drop into the recess $k^3$ and thereby disengage the clutch. Thus it will be seen that upon engaging the clutch the rear rake will be made to operate during one revolution of the gear $h$, and after this has been completed the parts will automatically result back to their normal and inactive position. In the use of my invention the machine is advanced upon the grass in the usual way and the cutting mechanism allowed to cut the grass. During this operation the shaft $e$ is revolving continuously and this will be followed by a similar movement of shaft $d'$ and a consequent operation of the front rake. This will draw the grass upon the platform $a$, and as it increases in quantity it is forced back and into the path of the rear rake. When the quantity of the grass makes it necessary, the cord $l$ is made to engage the clutch of gear $h^0$, and this will be followed by an operation of the rear rake, which will sweep the grass around between the wall or railing $a'$ and the guard $g^3$ and out of the opening $a^2$. From the opening $a^2$ the rake proceeds to the beginning of the curved rear portion of the railing, where it stops, owing to the automatic operation of the clutch previously described, and where it remains until it is necessary or desirable to again operate the rear rake. Hence it will be seen that by means of my invention the grass is not continuously deposited on the ground, thus necessitating gathering its small bunches, but that the grass is deposited in large bunches, say once in every fifty feet, which will make it easier to gather. The invention is adapted for use in connection with clover seed, but may be used in cutting other classes of grasses, as may be desired. I have not shown a complete mowing machine since my invention only relates to the raking devices and the platform, and no further description is deemed necessary.

Having thus described my invention, what I claim as new, and desire to secure by Letters Patent, is—

1. In a grass cutting machine, the combination of a cutting apparatus, a platform connected thereto, a drive shaft mounted on the platform, a gear loosely mounted thereon, a sleeve mounted so as to revolve with the drive shaft and capable of a longitudinal movement on the shaft, whereby it may be engaged with the gear thereon, a lever connected to the sleeve whereby it is operated, a spring for holding the lever so that the sleeve and loose gear will be disengaged, a rake on the platform, a gear connected to the rake and meshing with the loose gear and having a notch in its periphery, a friction roller on the lever and adapted to normally lie in the notch in the second gear, whereby the sleeve and the loose gear will be normally disengaged and whereby upon moving the friction roller out of its notch the said sleeve and gear may be engaged and the rake made to operate, substantially as described.

2. In a machine of the class described, the combination with a platform provided with standing walls or flanges forming a guideway for grain or grass, the rear portion of said guide-way being segmental in form, a cutting apparatus arranged at the front end of the platform and means for operating the same, of a reciprocatory rake arranged to operate adjacent to the cutting apparatus, means for operating said rake, a vertical shaft arranged concentric with said rear segmental portion of the guide-way, a lateral arm carried by said shaft, a second arm pivotally connected to the first mentioned arm and having a terminal rake, a spring for pressing said second rake carrying arm forward, and means under the control of the operator for rotating said shaft intermittently to carry the grass or grain through the segmental portion of the guide-way and discharge the same at the outlet end thereof, substantially as specified.

In testimony that I claim the foregoing as my own I have hereto affixed my signature in the presence of two witnesses.

ANDREW B. MILLER.

Witnesses:
 JAMES BABB,
 JOHN B. MILLER.